March 20, 1951  E. R. LOCKWOOD  2,545,927
CONSTANT TENSION NUT STOP

Filed Jan. 4, 1946

INVENTOR.
Ernest Roy Lockwood
BY Victor J. Evans & Co.
ATTORNEYS

Patented Mar. 20, 1951

2,545,927

UNITED STATES PATENT OFFICE 2,545,927

CONSTANT TENSION NUT STOP

Ernest R. Lockwood, Joliet, Ill.

Application January 4, 1946, Serial No. 638,947

2 Claims. (Cl. 151—25)

This invention relates to a lock nut of the type having a resilient member incorporated in a nut whereby upon engagement with threads of a bolt, stud or the like the resilient member is bowed slightly to place tension on the bolt or stud and with tension between the parts the nut will remain in clamping relation with an object.

The purpose of this invention is to provide an improved lock nut having a tension element therein wherein the parts are incorporated in the body of a nut without increasing the size or changing the appearance thereof.

Various types of lock nuts have been provided with latches and other locking and holding elements but it has been found difficult to construct a lock nut wherein locking elements are incorporated in the body of the nut. With this thought in mind this invention contemplates an improved lock nut having a pin secured in a socket therein wherein the pin is positioned to be engaged by a bolt or stud upon which the nut is threaded and thereby provide tension between the parts.

The object of this invention is, therefore, to provide means for constructing a lock nut whereby a pin may be incorporated therein so that tension may be provided between the nut and a stud or bolt upon which the nut is threaded.

Another object of the invention is to provide means for incorporating a tension pin in a nut or bolt and the like without increasing the size or design of the nut.

A further object of the invention is to provide a lock nut having a tension pin incorporated therein in which the pin is provided with conical shaped ends, which is of a simple and economical construction.

Other features and advantages of the invention will appear from the following description taken in connection with the drawings wherein:

Figure 1 is an end elevational view of a bolt having a nut therein with part of the bolt and nut broken away and shown in section, illustrating a pin in a socket in the nut in engagement with threads of the bolt.

Figure 2 is a detail illustrating the pin.

Figure 3 is a cross section taken on line 3—3 of Figure 1 illustrating the position of the pin between threads of the bolt.

Referring now to the drawings wherein like reference characters denote corresponding parts the improved lock nut of this invention includes a bolt 1 having a nut 2 threaded thereon with a socket 3 extended into the nut from one side and with a pin 4 having conical shape ends 5 extended longitudinally through the socket and positioned to be engaged by the threads of the bolt.

The socket 3 is provided with a conical shaped recess 6 in the inner end that is positioned to receive the inner end of the pin 4 and a similar recess 7 is provided in a plug 8 threaded in the outer end of the socket 3 for holding the opposite end of the pin. The recess 7 is aligned with the recess 6 whereby the pin extends through the center of a socket 3 until it is bowed outwardly by engagement thereof with the threads of the bolt 1.

The outer end of the plug 8 is provided with a screw driver slot 9 and tongues 10 extended from the nut 2 are positioned to be bent over the outer end of the plug for permanently retaining the plug in position.

With the parts arranged in this manner the pin 4 is inserted in the socket 3 and the plug 8 threaded into the outer end of the socket with the conical shaped ends 5 of the pin positioned in the recesses 6 and 7, respectively and with the parts in position the tongues 10 are bent over to secure the plug and pin in operative positions.

As the nut is threaded on a bolt or stud the threads of the bolt or stud engage the pin 4 and, forcing the pin outward slightly, and causing the pin to bow whereby tension is placed between the nut and bolt to prevent the nut working loose or backing off of the threads. With the parts arranged in this manner the nut may be removed by a wrench or the like in the usual manner.

It will be understood that modifications may be made in the design and arrangement of the parts without departing from the spirit of the invention.

What is claimed is:

1. A lock nut comprising a nut body having a bolt receiving threaded opening therethrough with a socket extended inwardly from one side and positioned transversely of the axis of said threaded opening, said socket having a conical shaped recess in the inner end and said body having internal threads in the outer end of the socket, a plug having a conical shaped recess in the inner end thereof threaded in the outer end of the socket and positioned whereby the recess therein is aligned with the recess in the inner end of the socket, and a pin having conical shaped ends positioned in the socket with one end in the recess in the inner end of the socket and the other in the recess in the plug, said socket and plug positioned whereby the pin frictionally engages threads of a bolt on which the nut is threaded.

2. A lock nut comprising a nut body having a bolt receiving threaded opening therethrough with a socket extended inwardly from one side and positioned transversely of the axis of said threaded opening, said socket having a conical shaped recess in the inner end and said body having internal threads in the outer end of the socket, a plug having a conical shaped recess in the inner end thereof threaded in the outer end of the socket and positioned whereby the recess therein is aligned with the recess in the inner end of the socket, a pin having conical shaped ends positioned in the socket with one end in the recess in the inner end of the socket and the other in the recess in the plug, said socket and plug positioned whereby the pin frictionally engages threads of a bolt on which the nut is threaded, and means securing the plug in position in the socket.

ERNEST R. LOCKWOOD.

REFERENCES CITED

The following references are of record in the file of this patent:

UNITED STATES PATENTS

| Number | Name | Date |
|---|---|---|
| 909,495 | Wiles | Jan. 12, 1909 |
| 982,502 | Jacobs | Jan. 24, 1911 |
| 1,367,648 | Webster | Feb. 8, 1921 |
| 2,445,125 | Reyburn | July 13, 1948 |

FOREIGN PATENTS

| Number | Country | Date |
|---|---|---|
| 34,027 | Bolinders (Sweden) | Nov. 1, 1910 |